US009771908B2

(12) United States Patent
Pilgram

(10) Patent No.: US 9,771,908 B2
(45) Date of Patent: Sep. 26, 2017

(54) VALVE FOR INJECTING FUEL

(75) Inventor: Guido Pilgram, Bamberg (DE)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 13/996,864

(22) PCT Filed: Nov. 7, 2011

(86) PCT No.: PCT/EP2011/069494

§ 371 (c)(1),
(2), (4) Date: Aug. 28, 2013

(87) PCT Pub. No.: WO2012/084328

PCT Pub. Date: Jun. 28, 2012

(65) Prior Publication Data

US 2013/0327970 A1 Dec. 12, 2013

(30) Foreign Application Priority Data

Dec. 23, 2010 (DE) ........................ 10 2010 064 105

(51) Int. Cl.
*F16K 31/06* (2006.01)
*F02M 51/06* (2006.01)
*F02M 63/00* (2006.01)

(52) U.S. Cl.
CPC ...... *F02M 51/061* (2013.01); *F02M 63/0017* (2013.01); *F02M 2200/09* (2013.01); *F02M 2200/306* (2013.01)

(58) Field of Classification Search
CPC ............. F02M 51/061; F02M 51/0635; F02M 51/0642; F02M 63/0017; F02M 63/0021; F02M 2200/09; F02M 2200/306
USPC .................................................... 251/129.16
See application file for complete search history.

(56) References Cited

U.S. PATENT DOCUMENTS 4,643,223 A * 2/1987 Abe ..................... F02M 59/466 137/375
4,673,163 A * 6/1987 Kushida ................ H01F 7/1638 251/129.1
5,004,440 A * 4/1991 Suzuki ............... G05D 16/2013 137/625.65
5,350,153 A * 9/1994 Morinigo .................. F01L 9/04 251/129.1
6,170,757 B1 1/2001 Herrmann et al.
6,367,769 B1 4/2002 Reiter
(Continued)

FOREIGN PATENT DOCUMENTS

CN 1388861 A 1/2003
CN 1714235 A 12/2005
(Continued)

OTHER PUBLICATIONS

International Search Report, PCT International Application No. PCT/EP2011/069494, dated Dec. 19, 2011.

*Primary Examiner* — Seth W Mackay-Smith
(74) *Attorney, Agent, or Firm* — Norton Rose Fulbright US LLP; Gerard Messina

(57) ABSTRACT

A valve for injecting fuel, including a valve positioning element, an armature connected to the valve positioning element, a stop that limits a movement of the armature, and a damping element provided between the armature and the stop, the damping element being applied as a damping layer on at least one part of the armature and/or on at least one part of the stop.

7 Claims, 2 Drawing Sheets

(56) References Cited

U.S. PATENT DOCUMENTS

| | | | | |
|---|---|---|---|---|
| 6,764,061 | B2 * | 7/2004 | Haeberer | F02M 47/027 251/129.16 |
| 6,848,669 | B2 * | 2/2005 | Makino | F02M 63/0019 251/129.15 |
| 7,946,276 | B2 * | 5/2011 | Pusch | F02M 61/166 123/472 |
| 7,963,270 | B2 * | 6/2011 | Ricco | F02M 47/027 123/472 |
| 8,020,789 | B2 | 9/2011 | Roessler et al. | |
| 8,037,869 | B2 * | 10/2011 | Ricco | F02M 47/027 123/472 |
| 9,140,223 | B2 * | 9/2015 | Ricco | F02M 47/027 |
| 2003/0042456 | A1 | 3/2003 | Makino | |
| 2009/0200405 | A1 | 8/2009 | Yoshimaru et al. | |

FOREIGN PATENT DOCUMENTS

| | | | |
|---|---|---|---|
| DE | 102004037250 | A1 | 2/2006 |
| DE | 10 2007 055 872 | | 9/2008 |
| EP | 1 262 655 | | 12/2002 |
| EP | 1 270 930 | | 1/2003 |
| JP | 63 125 875 | | 5/1988 |
| JP | 2003049747 | A | 2/2003 |
| JP | 2003156169 | A | 5/2003 |
| JP | 2003231014 | A | 8/2003 |
| JP | 2006509140 | A | 3/2006 |
| JP | 2006194237 | A | 7/2006 |
| JP | 2008215273 | A | 9/2008 |
| JP | 2009216081 | A | 9/2009 |
| JP | 2009287648 | A | 12/2009 |
| WO | WO 2004/051072 | | 6/2004 |

* cited by examiner

VALVE FOR INJECTING FUEL

FIELD

The present invention relates to a valve for injecting fuel, having a design that is simplified and lower in cost.

BACKGROUND INFORMATION

Conventional valves for injecting fuel are available in various embodiments. In magnetic valves, the armature is made of a soft magnetic material that can be produced for example as a rotating part. In order to increase long-term stability, the armature is coated with chrome. When there is a flow of current through the valve, a magnetic field is built up so that a needle fastened on the armature is accelerated and then impinges with a high impulse against a stop, e.g., an inner pole or a housing. Here, high impact impulses can occur, which can cause damage and in particular can cause chipping of the chrome layer. In addition, the chrome plating of the armature is very cost-intensive, and the metallic component chrome also transmits sound without damping it. In addition, the conventional armatures have a high mass, resulting in a large impulse, which in addition also causes a correspondingly loud impact noise.

SUMMARY

An example valve according to the present invention for injecting fuel may have the advantage that an improved damping of an impact impulse of an armature against a stop is possible. In addition, according to the present invention, a transmission of noise can also be damped. In addition to a significant cost reduction due to the omission of chrome plating, there also results in an increase in long-term stability. According to the present invention, this is achieved in that the chrome plating of the armature is omitted, and instead a damping element is provided between the armature and the stop. The damping element is applied as a layer on at least one part of the armature and/or on at least one part of the stop. The damping layer can be applied very easily and at low cost.

The armature is preferably fashioned as a disk, which can reduce the mass of the armature. In this way, an impact impulse at the stop when the armature is actuated is reduced. In addition to a realization of the armature as a disk, it is also alternatively possible for the armature to have, on a disk-shaped base surface, a circumferential edge that projects in the axial direction, so that armature has the shape of a pot. The pot-shaped armature can for example be produced by deep drawing or by extrusion. The disk-shaped armature can for example be produced by stamping.

The armature is preferably made of a soft magnetic material.

Particularly preferably, the damping layer is made of a nonmagnetic material, and provides a magnetic residual air gap at the armature.

Preferably, the damping layer is made of a hard plastic, e.g. PEEK (polyether ether ketone), or of an elastic material, in particular rubber. The damping layer is preferably sprayed onto the soft magnetic armature.

It is further preferred for the damping layer to have a thickness in a range of from 10 to 30 μm, preferably approximately 20 μm. It has turned out that in particular a thickness of 20 μm is optimal with regard to economical production and adequate damping function.

It is further preferred that the armature have one or more fuel bores through which fuel can be guided from a side of the armature through the armature to the other side of the armature and then to the valve outlet.

According to the present invention, magnetic injectors can thus be produced very easily and at low cost without chrome plating, also having, in addition to improved damping characteristics, reduced noise transmission and improved long-term stability. In addition, the valves according to the present invention can be valves that open inward or that open outward.

BRIEF DESCRIPTION OF THE DRAWINGS

In the following, a plurality of exemplary embodiments of the present invention are described in detail with reference to the figures.

DETAILED DESCRIPTION OF EXAMPLE EMBODIMENTS

Figure 1:
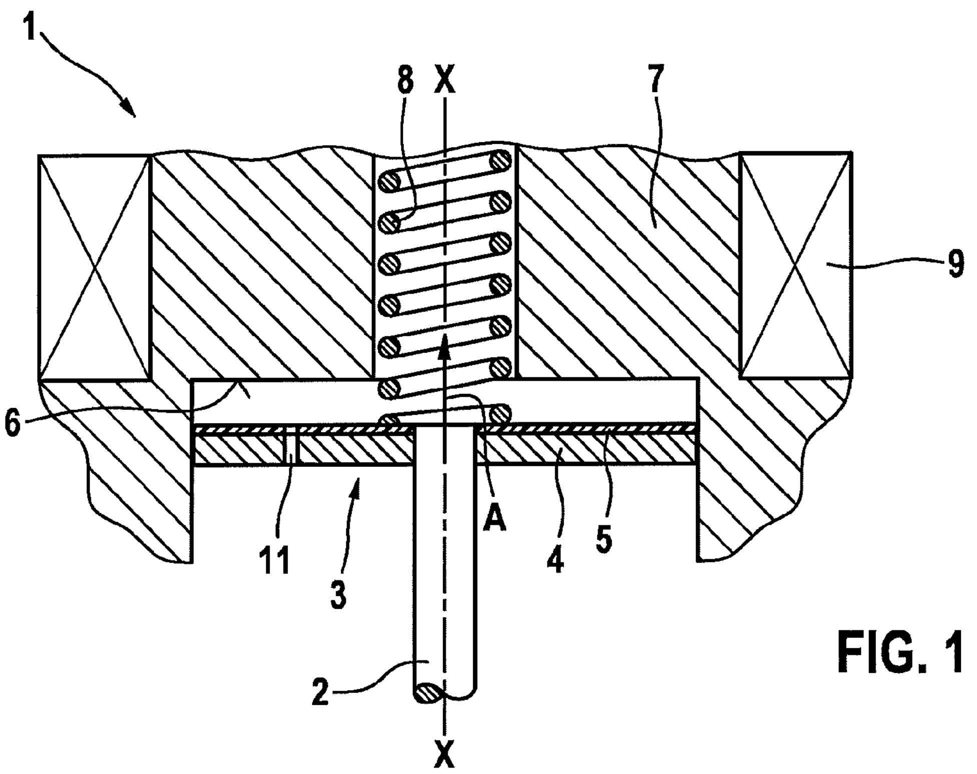
FIG. 1 shows a schematic sectional view of a valve according to a first exemplary embodiment of the present invention.

FIG. 1 shows a sectional view of a magnetic valve 1 according to a first exemplary embodiment for injecting fuel;

the valve is not shown completely, but only schematically. The valve includes a valve needle 2 as adjustment element and an armature 3 connected to the valve needle. In this way, valve needle 2 moves together with armature 3. In addition, on a housing 7 there is provided a stop 6 that limits a path of armature 3. A resetting of armature 3 takes place using a reset element 8. The valve is a magnetic valve, and further includes a coil 9 that, when current flows through it, moves armature 3 towards stop 6 in the direction of arrow A, thus opening the valve.

As can be seen in FIG. 1, armature 3 has an armature body 4 fashioned as a disk. On the side of armature body 4 oriented toward stop 6, there is applied a damping element 5 in the form of a damping layer. Here, the damping layer has a thickness of approximately 20 μm, and is shown in exaggerated fashion in FIG. 1 for reasons of clarity. The dampening layer is made of a nonmagnetic material, preferably plastic, or a rubber material. When armature 3 moves in the direction of arrow A, armature 3 thus strikes stop 6 with the damping layer. The damping layer accomplishes a damping of the impact impulse on stop 6, and in addition also accomplishes a damping of a transmission of noise. Because armature body 4 is a disk, a mass of the armature is also reduced, so that a reduced impact impulse at stop 6 also results.

In armature 3, there is also provided a through-opening 11 for a passage of fuel from one side of the armature to the other side of the armature.

Thus, according to the present invention, a chrome plating of the armature can be done without, and in addition to a lower-cost production of the armature, additional damping advantages can also be achieved.

Figure 2:
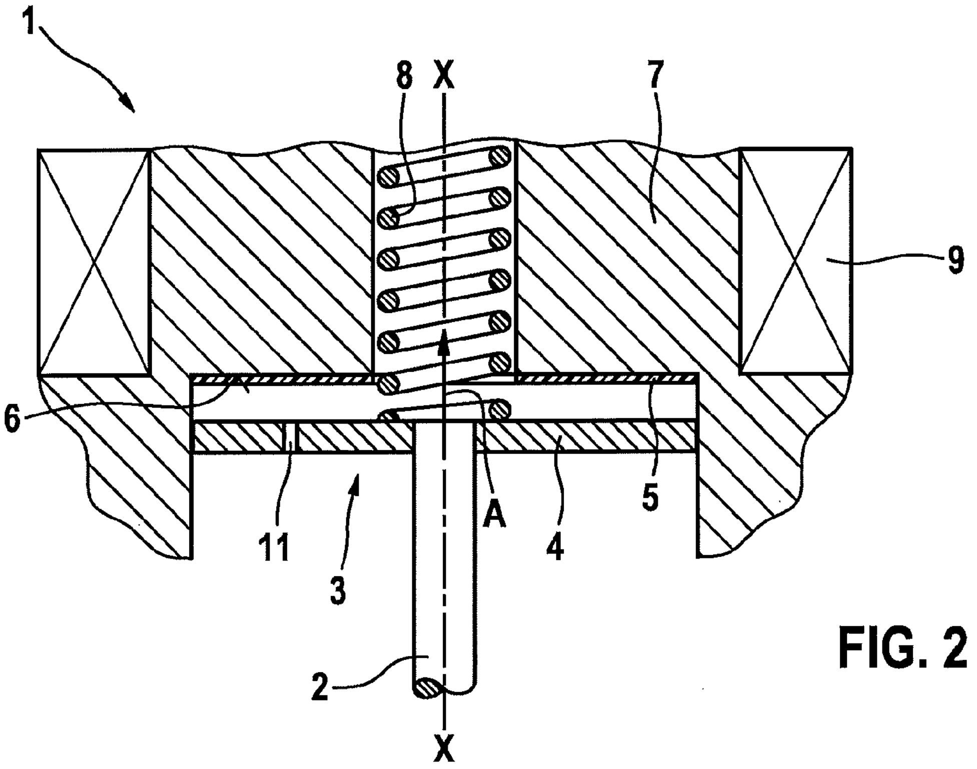
FIG. 2 shows a schematic sectional view of a valve according to a second exemplary embodiment of the present invention.

FIG. 2 shows a valve 1 according to a second exemplary embodiment of the present invention; identical or functionally identical parts have been provided with the same reference characters as in the first exemplary embodiment. As can be seen in FIG. 2, in the second exemplary embodiment damping element 5 is provided in the form of a damping layer on stop 6. Armature 3 includes only soft magnetic armature body 4. Thus, the damping layer situated on stop 6 takes over the same function as the damping layer in the first exemplary embodiment.

Figure 3:
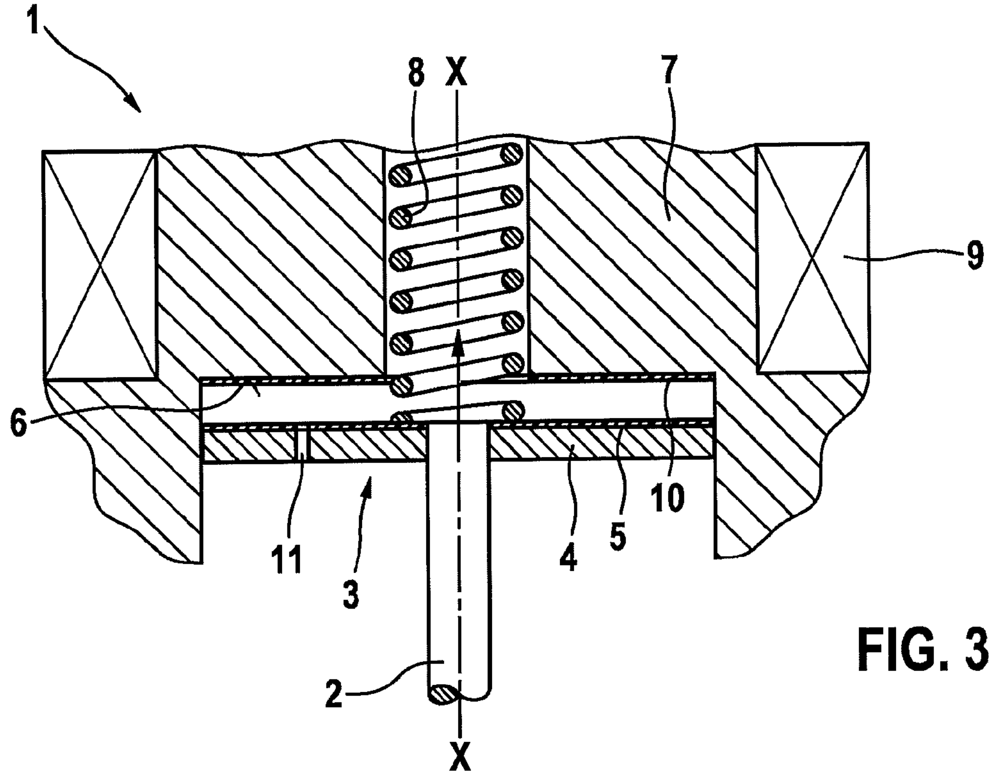
FIG. 3 shows a schematic sectional view of a valve according to a third exemplary embodiment of the present invention.

In the third exemplary embodiment, shown in FIG. 3, in addition to damping element 5 on armature 3 there is additionally provided a second damping element 10 on stop 6. Here, both damping elements can be made of the same material, for example a rubber coating. Here it is possible in particular for the thicknesses of the first and second damping layers to be reduced in comparison to the two previous exemplary embodiments, preferably to approximately half the thicknesses in the preceding exemplary embodiments.

Figure 4:
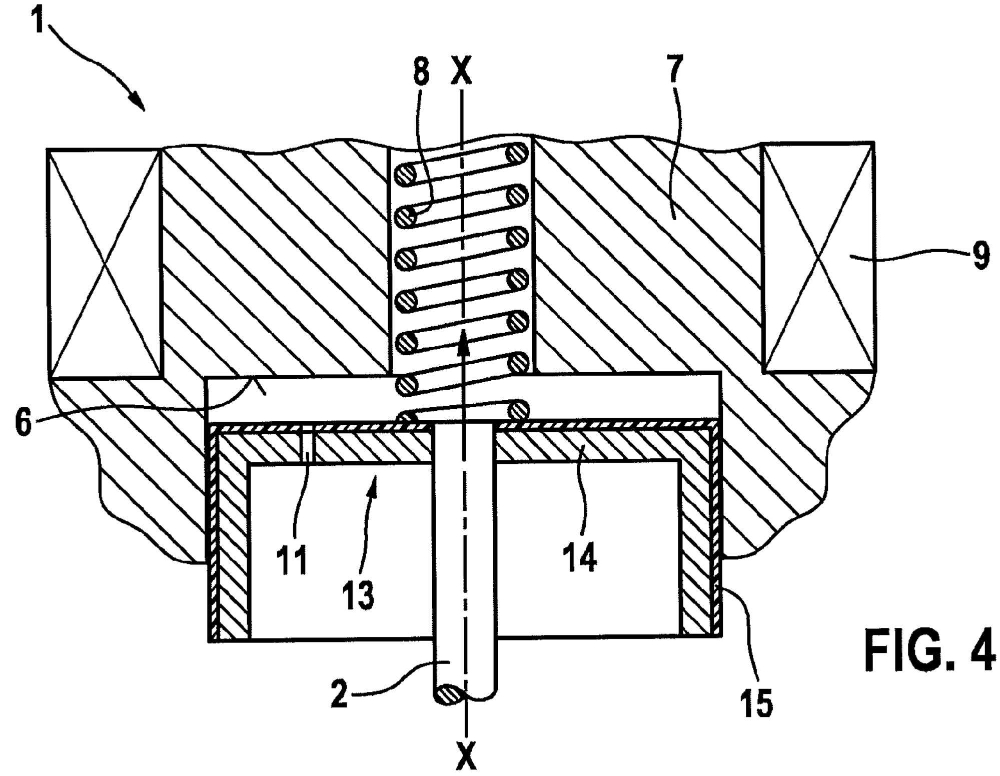
FIG. 4 shows a schematic sectional view of a valve according to a fourth exemplary embodiment of the present invention.

FIG. 4 shows a valve 1 according to a fourth exemplary embodiment, in which a pot-shaped armature 13 is provided. Pot-shaped armature 13 has a disk-shaped base surface 14 and a circumferential edge 15. In this exemplary embodiment, the damping layer is provided as a coating both on disk-shaped base surface 14, on the side oriented toward stop 6, and also on the outer side of circumferential edge 15. This has advantages in particular with regard to production. It is also to be noted that it is also possible for the pot-shaped armature to be rotated by 180°, and for the damping layer to be provided in the interior of the pot-shaped armature.

In each of the exemplary embodiments shown in FIGS. 1 through 4, a magnetic injector having an inwardly opening needle has been shown. However, it is to be noted that it is also possible to use the present invention with magnetic injectors that open outward.

What is claimed is:

1. A valve for injecting fuel, comprising:

a valve positioning element;

a pot-shaped armature connected to the valve positioning element, the pot-shaped armature having a base surface and a circumferential edge, wherein the circumferential edge is orthogonal to the base surface and is situated on an outermost circumference of the pot-shaped armature;

a stop that limits a movement of the pot-shaped armature; and a damping element situated between the pot-shaped armature and the stop, wherein the damping element is applied as a damping layer at least one of: i) on at least one part of the pot-shaped armature and, ii) on at least one part of the stop, and wherein the damping element is applied to the base surface and an orthogonal surface of the circumferential edge of the pot-shaped armature.

2. The valve as recited in claim 1, wherein the pot-shaped armature includes an armature body made of a soft magnetic material.

3. The valve as recited in claim 1, wherein the damping layer has a thickness of 20 μm.

4. The valve as recited in claim 1, wherein the pot-shaped armature has a through-flow opening for a passage of fuel.

5. The valve as recited in claim 1, wherein the damping layer is applied on at least one part of the pot-shaped armature.

6. The valve as recited in claim 1, wherein the damping layer is applied on at least one part of the stop.

7. The valve as recited in claim 1, wherein the damping layer is applied on at least one part of the pot-shaped armature and on at least one part of the stop.

* * * * *